(12) United States Patent
Smith et al.

(10) Patent No.: US 8,011,295 B1
(45) Date of Patent: Sep. 6, 2011

(54) FULLY AUTOMATED TWINE WRAPPING SYSTEM FOR A ROUND BALER HAVING A SIMPLIFIED OPERATOR INTERFACE

(75) Inventors: Kevin M. Smith, Narvon, PA (US); Mark K. Chow, Paoli, PA (US); James D. Walker, Lititz, PA (US); Justin R. Ringwald, Ellinwood, KS (US)

(73) Assignee: CNH America LLC, New Holland, PA (US)

( * ) Notice: Subject to any disclaimer, the term of this patent is extended or adjusted under 35 U.S.C. 154(b) by 0 days.

(21) Appl. No.: 12/756,951

(22) Filed: Apr. 8, 2010

(51) Int. Cl.
*B65B 57/04* (2006.01)
*B65B 57/18* (2006.01)

(52) U.S. Cl. .................. 100/4; 100/88; 100/99; 56/341; 53/211; 53/587

(58) Field of Classification Search .................. 100/4, 5, 100/13, 43, 45, 76, 87, 88, 99; 56/341, 344; 53/118, 176, 211, 587, 588, 589, 590, 389.2, 53/389.4
See application file for complete search history.

(56) References Cited

U.S. PATENT DOCUMENTS

| | | | |
|---|---|---|---|
| 4,603,379 A | 7/1986 | Strosser et al. | |
| 4,624,179 A | 11/1986 | Yves et al. | |
| 4,748,802 A | 6/1988 | Strosser et al. | |
| 4,930,411 A | 6/1990 | Naaktgeboren | |
| 4,998,961 A | 3/1991 | Anderson et al. | |
| 5,152,123 A | 10/1992 | Viaud et al. | |
| 5,388,504 A | 2/1995 | Kluver | |
| 5,473,870 A | 12/1995 | Panoushek et al. | |
| 5,551,218 A | 9/1996 | Henderson et al. | |
| 5,557,510 A | 9/1996 | McIntyre et al. | |
| 5,568,716 A | 10/1996 | Kluver et al. | |
| 5,631,826 A | 5/1997 | Chow | |
| 6,050,052 A | 4/2000 | Herron et al. | |
| 6,209,450 B1 | 4/2001 | Naaktgeboren et al. | |
| 6,615,114 B1 | 9/2003 | Skiba et al. | |
| 6,634,284 B2 | 10/2003 | Parker | |
| 7,114,376 B2 | 10/2006 | Loucks et al. | |
| 7,337,713 B1 | 3/2008 | Olander et al. | |
| 7,350,343 B2 | 4/2008 | Beck | |
| 7,401,496 B2 | 7/2008 | Ho et al. | |
| 7,546,215 B2 | 6/2009 | Muhammad et al. | |
| 2006/0048481 A1* | 3/2006 | Hood et al. ..................... | 53/399 |
| 2008/0224445 A1* | 9/2008 | Viaud et al. ................... | 280/442 |
| 2008/0228323 A1 | 9/2008 | Laumer et al. | |
| 2008/0282647 A1* | 11/2008 | Hood et al. ..................... | 53/399 |
| 2009/0049817 A1 | 2/2009 | Viaud | |
| 2009/0107102 A1* | 4/2009 | Biziorek ......................... | 56/341 |
| 2009/0107209 A1 | 4/2009 | Limoges | |
| 2010/0122632 A1* | 5/2010 | Biziorek et al. ................. | 100/2 |

\* cited by examiner

*Primary Examiner* — Jimmy T Nguyen
(74) *Attorney, Agent, or Firm* — Patrick M. Sheldrake; Michael G. Harms

(57) ABSTRACT

An automated bale wrapping control system for a round baler that includes a simplified remotely installable operator interface for installation on a tractor. The simplified operator interface includes manual operated, mechanical input switches for selecting system on/off, number of wraps, twine or net wrapper selection, manual extension/retraction of the wrapping mechanism, and/or manual wrap cycle initiation. An audible alarm provides feedback to the operator for monitoring the baling and wrapping processes and for alerting the operator to abnormal conditions in the baling and/or wrapping processes.

23 Claims, 4 Drawing Sheets

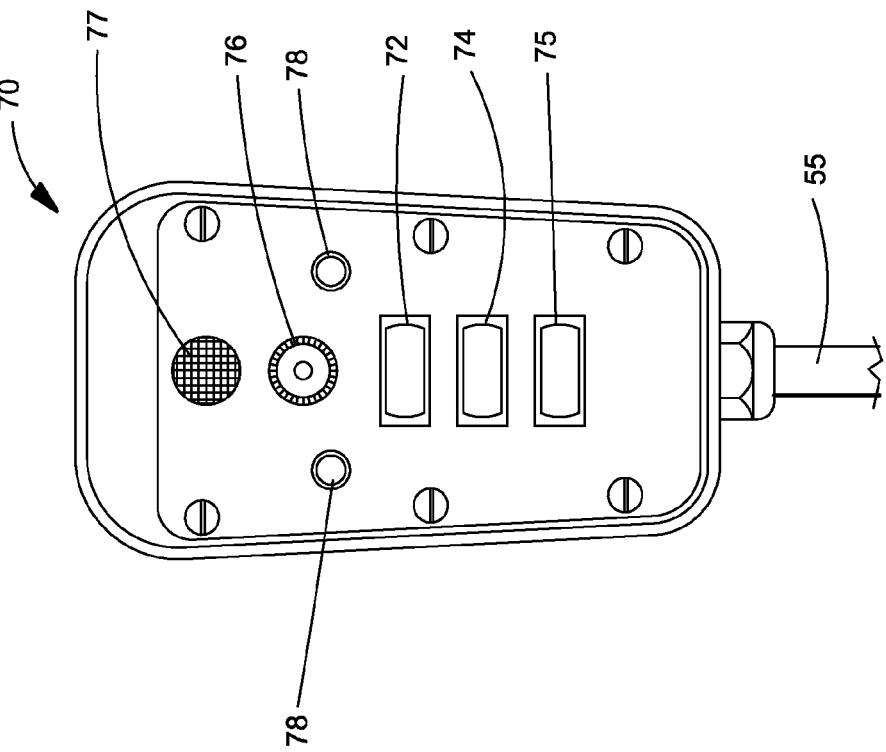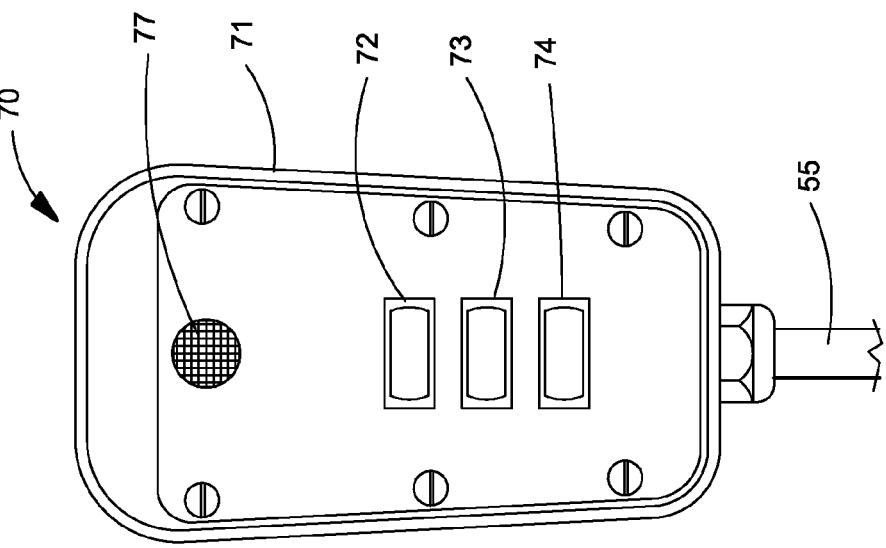

FULLY AUTOMATED TWINE WRAPPING SYSTEM FOR A ROUND BALER HAVING A SIMPLIFIED OPERATOR INTERFACE

BACKGROUND OF THE INVENTION

This invention relates to agricultural balers for forming round bales of crop material and automatically wrapping the bales with twine before releasing them onto a field. More particularly, the invention relates to improvements in the twine wrapper control system to enable control system operation using a simplified operator console.

Demand for operational efficiency continues to increase in crop packaging, especially in round balers. Efficiency gains in equipment operation and/or improvements in equipment operating lifespan all serve to improve the economics surrounding crop packaging. Improvements are typically introduced in larger balers where tractors are equipped with sophisticated control systems that can interface with increasingly complex implement control systems to achieve the desired implement operational efficiency improvements. It is also desirable to offer the equipment operational improvements across an entire equipment line, not just the larger, more complex models. Adapting the sophisticated control systems necessary to achieve the operational improvements to simpler implements and/or tractors that may lack some or all of the necessary control system features demands innovation.

One such improvement is an automatic bale wrapping system for round balers. Typical round balers having automatic wrapping capability, such as those produced by Case New Holland North America, pick up crop material from a field and form it into a compacted round bale in a bale forming chamber. When the bale has been compacted to a desired density (or reached a desired size), bale density (or size) sensors send signals to a controller which in turn sends signals to an operator's panel to alert the operator to stop forward motion of the baler so that the bale may be wrapped with netting or twine according to a program of instructions stored in the controller memory.

After a brief delay allowing time for the operator to stop forward motion of the baler, the controller initiates a wrap cycle. The mechanism for wrapping with twine includes one or more hollow twine tubes. Strands of twine are fed from twine rolls through the tubes. When a wrap cycle is initiated, the twine tubes are moved arcuately to an extended or insert position with an end of each twine strand dangling from the end of a respective one of the tubes. A pusher mechanism, usually referred to as a "duckbill", is actuated to move the dangling ends toward the bale so that the ends of the twine strands are adjacent the bale near its lengthwise middle. The strands are caught up in the bale which is rotating within the bale forming chamber. The bale is then wrapped in a pattern by moving the twine tubes toward a home (outboard) position with programmed pauses at intervals to place circular wraps on the bale. The twine is cut after end wraps have been placed on the bale and the bale is ejected from the baler onto the ground. The mechanism for wrapping with net relies on fingers in the duckbill to hold a free end of the net wrap and insert the free end into the bale forming chamber. Once the net wrapper is engaged by the bale, the duckbill is partially withdrawn until the bale is fully wrapped. The duckbill is then fully withdrawn once the bale is fully wrapped which severs the net wrap from the supply allowing the wrapped bale to be ejected from the baler. Twine tubes are not required with a net wrap system. Another signal from the controller to the operator interface informs the operator that forward motion for crop pickup can resume once the wrapping process is completed. A display console communicating with the control system informs the operator of the wrapping progress, alerts the operator to any problems in the wrapping cycle, and often provides touch-sensitive controls for operator input options.

While such operator convenience is readily accomplished on tractors having electronic control systems, data communications networks, and video screen operator displays already installed, it would be similarly advantageous to provide a similar level of bale wrapping automation on less complex tractors. With this in mind, it would be advantageous to provide a control system for automating the bale wrapping process which includes an ECU and a simplified operator interface capable of functioning without a visual display or similarly complex tractor-mounted operator interface. Further advantages would be realized by a simplified operator interface capable of providing alarm and monitoring capability for the entire baler operation process and operator control inputs for adjusting key parameters, calibrating sensors, and manual bale wrapping initiation. These and other advantages are provided by the draft control system described below.

SUMMARY OF THE INVENTION

Accordingly, the present invention, in any of the embodiments described herein, may provide one or more of the following advantages:

It is an object of the present invention to provide an automatic control system for an agricultural baler that includes an ECU and a simple operator interface.

It is a further object of the present invention to provide an automatic baling control system for an agricultural round baler having a simple operator interface that may be removably positioned adjacent to the operator for convenience.

It is a further object of the present invention to provide an automatic baling control system for an agricultural round baler having a simple operator interface with a non-visual operator feedback interface.

It is a further object of the present invention to provide an automatic bale wrapping system for an agricultural baler that includes a series of operator input switches to enable the operator to control some or all of the baler wrapping functions, including on/off, number of wraps, twine or net wrapper selection, manual extension/retraction of the wrapping mechanism, and/or manual wrap cycle initiation.

It is a further object of the present invention to provide an automatic bale wrapping system for an agricultural baler that includes an alarm to inform an operator of bale wrapping sequence progress and/or to alert the operator of abnormal circumstances in the bale wrapping process.

It is further object of the present invention to provide an automatic bale wrapping system for an agricultural baler wherein the operator inputs are received through simple mechanical switches.

It is a still further object of the present invention to provide an automatic bale wrapping system for an agricultural baler wherein an audible alarm informs an operator to bale wrapping progress or alert the operator to abnormal circumstances in the bale wrapping process.

It is a still further object of the present invention to an automatic bale wrapping system for an agricultural baler that will automatically calibrate wrapping mechanism position sensors periodically or in response to an operator initiated input.

It is a still further object of the present invention to provide an automatic control system for a baler having an operator interface that is removable from the tractor when the baler is not in use.

It is a still further object of the present invention to provide an automatic bale wrapping system for an agricultural baler that is durable in construction, inexpensive of manufacture, carefree of maintenance, easily assembled, and simple and effective to use.

These and other objects are achieved by providing an automated bale wrapping control system for a round baler that includes a simplified remotely installable operator interface for installation on a tractor. The simplified operator interface includes input switches for selecting system on/off, number of wraps, twine or net wrapper selection, manual extension/ retraction of the wrapping mechanism, and/or manual wrap cycle initiation. An audible alarm provides feedback to the operator for monitoring the baling and wrapping processes and for alerting the operator to abnormal conditions in the baling and/or wrapping processes.

BRIEF DESCRIPTION OF THE DRAWINGS

The advantages of this invention will be apparent upon consideration of the following detailed disclosure of the invention, especially when taken in conjunction with the accompanying drawings wherein:

FIG. 2 shows a first embodiment of the operator interface of the present invention;

FIG. 3 shows an alternate embodiment of the operator interface of the present invention;

DESCRIPTION OF THE PREFERRED EMBODIMENT(S)

Many of the fastening, connection, processes and other means and components utilized in this invention are widely known and used in the field of the invention described, and their exact nature or type is not necessary for an understanding and use of the invention by a person skilled in the art, and they will not therefore be discussed in significant detail. Also, any reference herein to the terms "left" or "right," "up" or "down," or "top" or "bottom" are used as a matter of mere convenience, and are determined by standing at the rear of the machine facing in its normal direction of travel. Furthermore, the various components shown or described herein for any specific application of this invention can be varied or altered as anticipated by this invention and the practice of a specific application of any element may already be widely known or used in the art by persons skilled in the art and each will likewise not therefore be discussed in significant detail. It should be noted that throughout this description the drawings are diagrammatic in nature to best show the elements of the baler in which the invention is embodied. To this end, in many instances only one element in a pair is shown, especially in those cases where identical elements exist, disposed on opposing sides of the baler, e.g., wheels.

Figure 1:
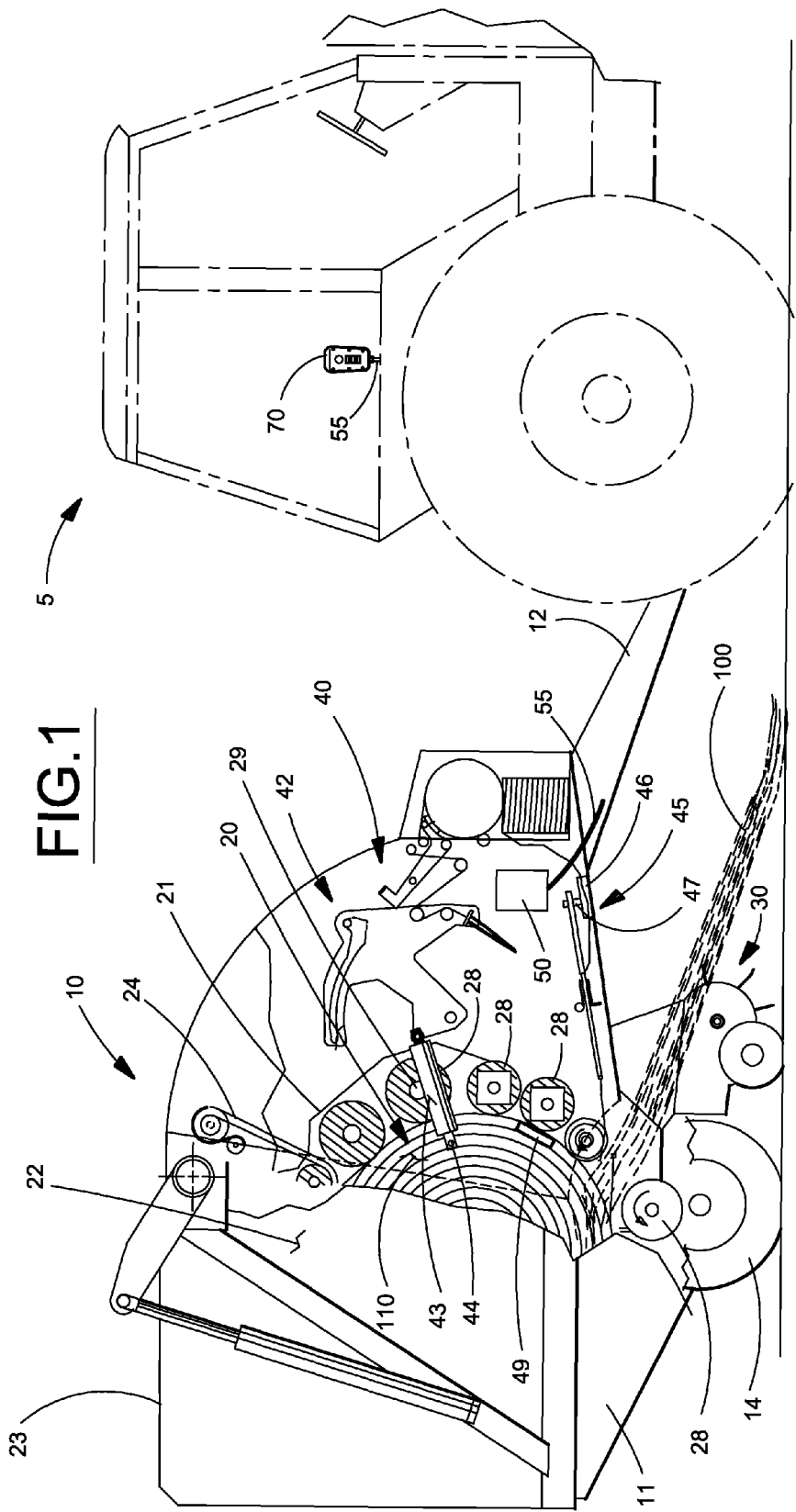
FIG. 1 is a side view of an agricultural round baler of the type on which the present invention is useful.

FIG. 1 schematically illustrates a generally well-known baler 10, such as the Case New Holland 4x5 utility round baler, which is adapted to be pulled by, and powered from, a conventional agricultural tractor 5. Baler 10 comprises a main frame 11 terminating forwardly in a tongue 12 and rearwardly slightly beyond a transverse axle to which a pair of wheels 14 (only one shown) are mounted-thus forming a wheel supported main frame. Such balers have an expandable bale chamber 20 generally defined by a pair of fixed sidewalls 22, and a plurality of side-by-side belts 24 cooperating with a series of transverse rolls 28, mounted between a pair of pivotally mounted arms, commonly known as a sledge, supported by the main frame. The chamber includes an inlet opening in the front through which crop material is fed. Other combinations of belts, rollers, and/or pulleys are also known as methods for defining the bale forming chamber and are contemplated within the scope of this invention. This type of expandable chamber is disclosed in various prior art patents, such as U.S. Pat. Nos. 4,870,812 and 4,979,442 issued to Jennings et al., which are hereby incorporated by reference.

Baler 10 is shown having a wrapping apparatus 40 on which the present invention is useful, which may be a twine wrapping system or a net wrapping system. Cut crop material 100 is picked up from the ground by a transverse pickup 30 and fed into bale-forming chamber 20 where it is formed into a cylindrically shaped bale 110 by movement of the belts 24 and rolls 28 connected to a movable sledge 21. A completed bale 110 is then wrapped with twine or a wrapping material by the wrapping apparatus 40 to maintain the bale shape after ejection from the baler. The wrapping apparatus 40 may be a net wrapping apparatus 42 or a twine wrapping apparatus 45. Typically one or the other is provided in a baler, but balers having both types with provisions to select the method of wrapping are also available. Such a baler is used for illustrative purposes in this disclosure. Upon completion of the wrapping process, the tailgate 23 pivots upwardly to open the rearward portion of the bale forming chamber 20 and the bale 110 is ejected onto the ground. Exemplary prior art wrapping mechanisms are shown in U.S. Pat. Nos. 4,956,968, 5,289, 672, and 6,021,622, all by Underhill, the descriptive portions of which are incorporated herein by reference.

Utility balers of the type on which the present invention is useful typically include limited automation in order to maintain competitive baler costs. Larger size round balers typically include automation for most, if not all normal baling functions and rely on complex control systems both on the baler and the tractor to which it is attached. Most require that the tractor have a computer display screen, typically touch sensitive, in order to adequately interface with the baler controller. The typical touch screen display is capable of receiving input from the operator and providing output indication to the operator. Tractors used for pulling utility balers of the type on which the present invention is useful typically lack suck sophisticated control interfaces.

In the utility baler of this disclosure, operation of wrapping apparatus 40 and other baler functions is managed by a controller 50 located on the baler 10. Controller 50 is provided to automate, to the extent practical, baling and wrapping operations by providing output signals to actuators 43, 46 for the bale wrapping apparatus 40, tailgate 23, and/or alarms and indication for the tractor operator. Controller 50 also receives feedback inputs from sensors on the baler indicating sledge position (indication of bale size), roll/belt speed, and the position of the wrapping mechanism, whether net wrapping 44, twine wrapping 47, or both. Controller 50 also receives selective inputs from a tractor operator via a user interface 70 positioned on the tractor 5 which enables selection of pre-determined baler actions. In one embodiment, pre-determined actions include automatic/manual wrapping selection, wrap density (number of wraps) selection, net/twine wrap selection, and/or position sensor calibration selection. Controller 50 is preferably a digital controller that is easily configured to provide the desired control functions.

Now referring to FIG. 2 in conjunction with FIG. 1, user interface 70 of the present invention is shown comprising a compact console housing 71 having a plurality of manually actuated rocker switches 72, 73, 74 for switching electrical circuits, each having two or three mechanical positions, and an audible alarm horn 75. The housing 71 is located on the tractor 5 in a manner allowing convenient operator access during baler operation. The operator interface may be removed from the tractor when it is not needed to control baler operation. Operator interface 70 is connected to controller 50 by an interface cable 55. Interface cable 55 may include signaling conductors (input/output) and power conductors which may interface with controller 50 or be directed to other components on the baler 50. The interface cable also provides a means to convey electrical power from the tractor to the baler components. Rocker or similar mechanical switches are economical and simple; their use enables a cost-effective operator interface to be produced. First switch 72 is a three-position single pole switch that provides combined input signals for powering on/off the control system and for selecting between automatic and manual modes of wrapper operation. Second switch 73 is also a three-position single pole switch that allows selection of the bale wrapping density. The three positions normally enable selection of one of three pre-determined densities. In the present invention, the switch is also used to manually initiate an automatic wrap cycle. Controller 50, upon receipt of cyclical toggling of second switch, such as 5 cycles between two switch positions in 5 seconds, is programmed to initiate an automatic bale wrap cycle. This feature enables the operator to manually initiate a re-wrap of a bale or a wrap of a partial bale using the automatic bale wrapping program, but does not require the addition of an additional switch on the operator interface console. Third switch 74 is a three-position switch, preferably with a spring return to the center (neutral) position that enables the operator to manually cycle the wrapping apparatus. The non-neutral positions initiate signals to selectively extend or retract the wrapping apparatus, respectively. The present invention adds to the function of this switch by incorporating a manual calibration of the wrapping apparatus position into the controller 50.

Horn 77 is provided to provide feedback on various operations to the operator using a determined of beep sequences. The horn 77 is used to alert the operator of some or all of the following conditions: full bale, wrap sequence complete, tailgate closed, tailgate open during baling, automatic wrap sequence incomplete, and/or wrapper apparatus not in home position during baling. For each alarm sequence, the alarm sound is made unique by varying the dwell (duration of the tone, pause (duration of the non-tonal period between tones), tone repeat frequency, and number of horn pulses in a manner allowing the audible horn to functionally replace a visual display. An audible alarm is preferred as it provides feedback to the operator without requiring the operator to focus attention on the interface.

Referring to FIG. 3, an alternate embodiment of the invention is presented wherein limited additions to the operator interface 70 are incorporated to further enhance the capability of the interface while retaining the simple and economical operator interface 70 that is readily adaptable on a basic tractor. The wrap density is traditionally established by a rocker switch (second switch 73) which provides the user with three choices for wrap density, generically termed as high, medium, and low. Broader application of the user interface 70 can be achieved by replacing the rocker switch with a wrap density potentiometer 76. The potentiometer 76 provides a varying voltage signal to the controller 50 instead of simple voltage/no-voltage signals available with second switch 73 and provides the operator greater control over the wrap density. The varying signal is used by controller 50 to manage the twine arm movement speed (affects number of wraps per unit bale width) or the net wrapper knife time delay (affects number of bale revolutions while net wrap is being dispensed). This greater input flexibility also allows the operator interface to be used with a broader array of balers within the class and accommodate variations in bale diameter (typically ranging from 5 to 6 feet) and width (4 or 5 feet) typically offered by various CNH utility baler models.

Figure 5:
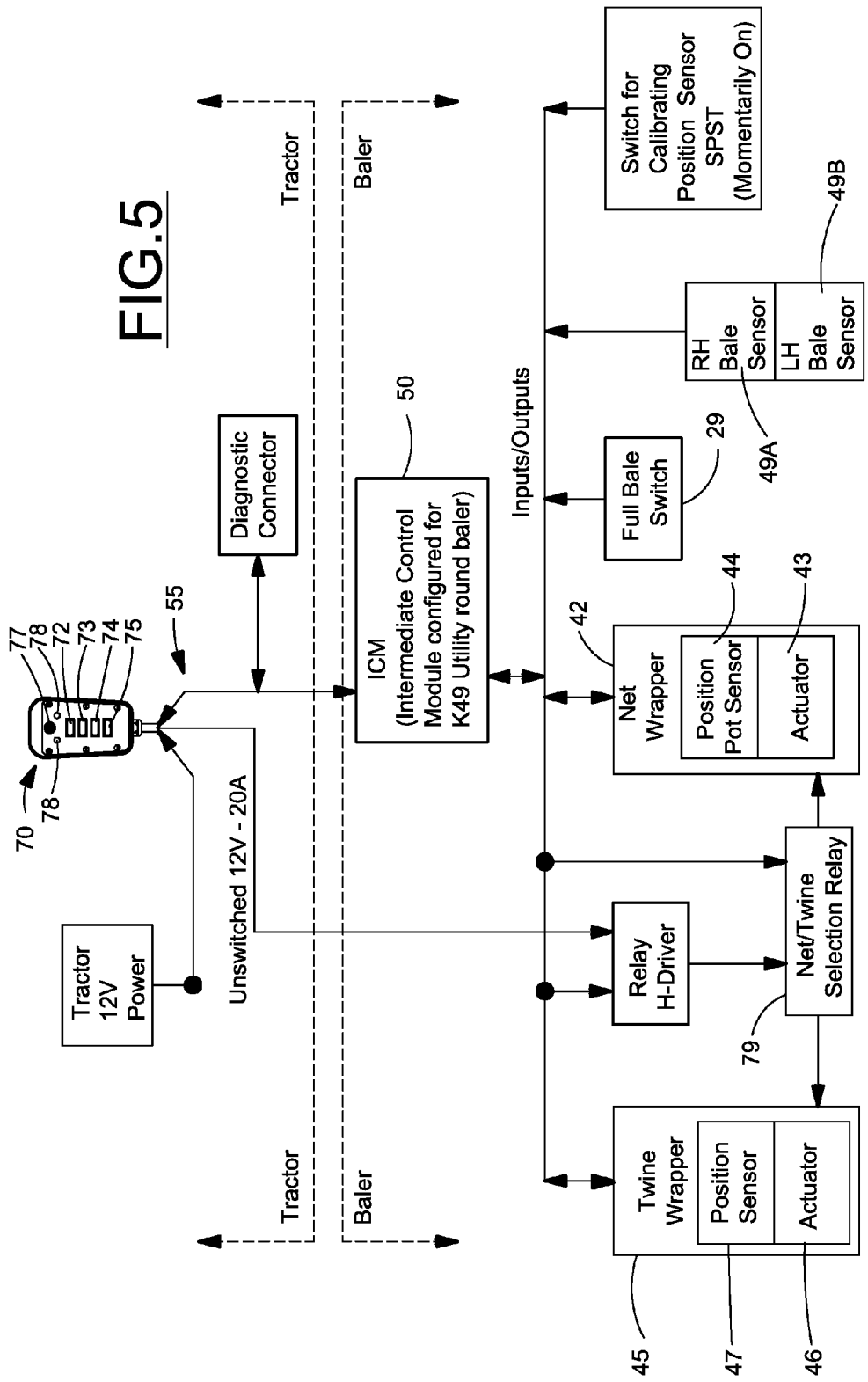
FIG. 5 is a block diagram of an automatic bale wrapping system for a baler featuring provisions to control a baler capable of wrapping a bale with twine or net wrapping.

Referring now to FIGS. 1, 3, and 5, a feature common in more complex balers is shown incorporated on the smaller utility baler 10. One or more bale shape sensors 49 are incorporated in the bale chamber to sense the relative side-to-side shape of the bale 110 during bale formation. Shape sensors 49 detect crop material adjacent to the side walls of the baler (end of the bale roll) as an indicator that the shape of the forming bale remains generally uniformly cylindrical. The output of the bale shape sensors is typically displayed to the operator in the form of bar graphs on a display screen. In the present simplified operator interface 70 for the bale wrapping operation, a pair of indicator lamps, preferably one or more LEDs 78, may be easily provided to indicate other baler operations, such as the shape of the bale forming in the bale chamber. While such a feature could be adapted to communicate using a non-visual interface, such as unique tones using horn 77, simple indicator light keeps the production costs of operator interface relatively low while maintaining an easy to use interface that does not require an operator to distinguish a broad array of audible signals. LEDs 78 replace the bar graph currently used on most balers, with at least one LED 78 corresponding to the left side of the bale and at least one LED 78 corresponding to the right side. Controller 50 would receive input from the right and left side sensors 49A, 49B, respectively, and direct output signals to the LEDs 78 causing them to flash at pre-determined variable rates corresponding to the side-to-side bale chamber fill. The frequency of the blinking lights 78 directly relates to the relative chamber bale fill. For instance, if no crop is present on the left hand side of the chamber, the light would be continuously on. If the bale shape potentiometer indicates a partially filled side, the light would blink at about 1 hz. For a completely filled end of bale the light would be completely off. Other alternative logic could be used to correlate light flashing with bale shape including comparing left side sensor to right side sensor, and flashing a different color LED corresponding to a full versus an empty signal.

In the typical fully automated baler system, sensor calibration is normally accomplished through dedicated device setup screens in an operator visual interface. On less complex balers, sensor calibration is typically initiated using switches mounted on the baler itself. In the present invention, sensor calibration is initiated either automatically or in response to a simplified operator input. Self calibration occurs by programming configuration in controller 50 which initiates a sensor calibration following power up and the first automatic wrapping cycle. As the wrapping apparatus moves to a fully extended position, sensed by a stall condition in the actuator, the controller 50 suspends further actuation in the extend direction and establishes a start or first position setting. The controller 50 then reverses the actuator to move the wrapping apparatus in the retract direction. Wrapping is being dispensed during this movement; however, the controller 50 also monitors the wrapping apparatus movement until a stall is again detected. The controller then establishes the home position for the sensor. The controller 50 can be configured to periodically execute the calibration process on any number of pre-selected intervals in order to assure that wrapping apparatus movement between the extended and home positions is properly sensed. Manual calibration may also be initiated by placing the system in manual operation using the manual/automatic selector switch 72 into manual operation and the using the extend/retract selector switch 74 to manually move the wrapping apparatus to the fully extended and home positions. At each extreme, the controller detects a stall condition in the actuator and sets the sensor calibration for the appropriate position.

Figure 4:
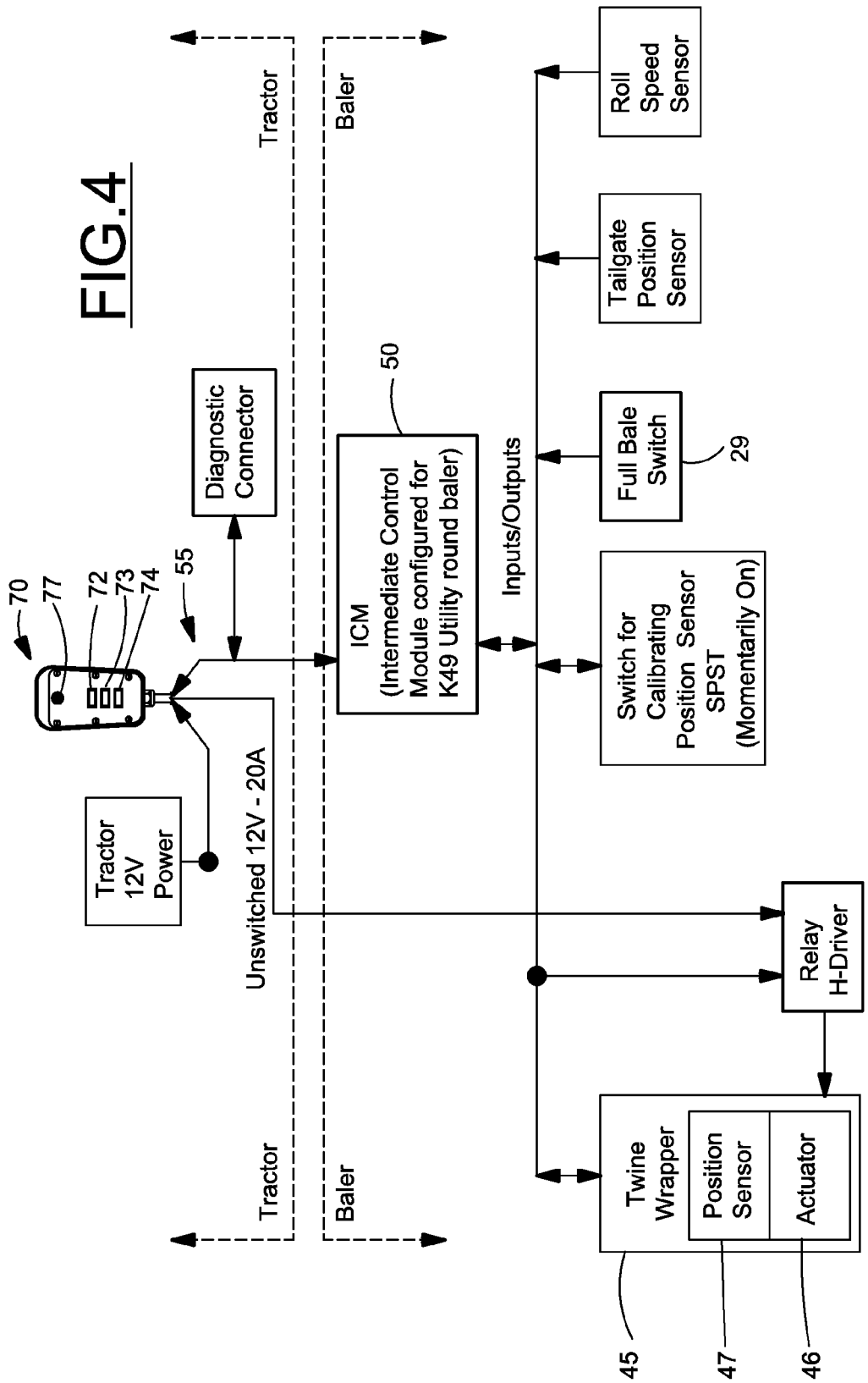
FIG. 4 is a block diagram of an automatic bale wrapping system for a baler showing one embodiment of the present invention.

Now referring to FIGS. 4 and 5, in connection with FIGS. 1 through 3, a pair of functional block diagrams is presented. FIG. 4 shows a block diagram for an automatic bale wrapping system on a baler having a single wrapping apparatus (a twine wrapping apparatus 45 in the figure) wherein controller 50 receives input from and directs output to operator interface 70. The baler controller 50 has input/output interfaces with a bale size position switch 29 (typically connected to the movable sledge 21 as a means to indicate the size of the bale in the chamber), a wrapper position switch 47 and wrapper actuator 46. Programming in the controller 50 manages automatic operation of the bale wrapping process as well as monitoring operation of the baling process. Input signals initiated from the switches 72, 73, 74 on operator interface 70 enable selective operator inputs to be directed to the controller 50. Controller 50 provides output signals to horn 77 causing audible indications of varying tonal frequency, pulse number, and/or pulse rate to alert the operator of operations or conditions within the baler.

FIG. 5 shows a block diagram for a baler having provisions for a twine wrapping apparatus 45 and a net wrapping apparatus 42. Baler 10 may have one or both installed; the controller 50 in FIG. 5 is configured to enable selective operation of either wrapping apparatus thereby providing greater manufacturing flexibility. An additional mode selector switch 75, preferably a single pole, double throw manually operated switch is added to operator interface 70. Mode selector switch 75 activates a relay 79 which in turn causes the selected wrapper apparatus to be active.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inventions.

Having thus described the invention, what is claimed is:

1. An agricultural baler control system for managing operation of a baler propelled by a tractor, said control system comprising:
   a controller disposed on the baler selectively configurable to manage operation of a wrapping apparatus by receiving one or more input signals and initiating one or more output signals responsive to said one or more input signals; and
   an operator interface configured to be removeably positioned on the tractor during baler operation, said operator interface having at least one switch and a non-visual signaling device operably connected to said controller, said at least one switch having at least first and second positions, wherein said controller is configured to receive inputs from said at least one switch by cycling said at least one switch between said first and second positions a pre-determined number of cycles within a pre-determined time period, said controller further configured to initiate a signaling device output signal causing said non-visual signaling device to produce a plurality of unique alert sequences, each said alert sequence being unique through variations in number of alert pulses, duration of alert pulses, or frequency of alert pulses, said plurality of alert sequences individually corresponding to positions of the wrapping apparatus, stages of the wrapping operation, and faults within the wrapping apparatus thereby enabling said operator interface to inform an operator of wrapping apparatus operation without the use of a visual display.

2. The control system of claim 1, wherein said non-visual signal device is an audible horn.

3. The control system of claim 2, wherein said operator interface further comprises a wrap pattern selector switch having a first pattern position, a second pattern position, and a third pattern position, and said controller is configured to wrap the bale in one of three pre-determined wrap patterns based upon the position of the wrap pattern selector in said first, second, and third switch pattern positions, respectively, said controller further configured to initiate a bale wrapping cycle when said wrap pattern selector switch is cycled between said first and said second pattern positions a pre-determined number of times within a pre-determined time interval and to inform the operator of completion of said wrapping cycle by directing a wrap completion signal to said audible horn.

4. The control system of claim 3, wherein said wrapping apparatus has at least one position sensor for monitoring the position of a wrapper mechanism and directing a position input signal to said controller, said wrapper mechanism positionable between generally opposing inserted and home positions, and said operator interface further comprises a wrapper mechanism position switch having an insert position, a retract position, and a neutral position, and said controller is configured to calibrate said at least one position sensor responsive to movement of said wrapper mechanism position switch to said insert position, detecting said wrapper mechanism reaching said inserted position and setting an extended position value in said controller corresponding to said at least one position sensor position input signal, directing a first calibration signal to said audible horn, detecting movement of said wrapper mechanism position switch to said home position, detecting said wrapper mechanism reaching said home position and setting an home position value in said controller corresponding to said at least one position sensor position input signal, and directing a second calibration signal to said audible horn.

5. The control system of claim 4, wherein said operator interface further comprises a mode selector switch positionable in an automatic mode position, a manual mode position, or an off mode position, said controller further comprises an automatic operation mode, a manual operation mode, and an off mode, each selectable by positioning said mode selector switch in a corresponding position.

6. The control system of claim 3, wherein said wrap pattern selector switch is a mechanically actuated switch producing an output signal of variable value, said variable value determined by variations in switch position, said controller is response to said variable value signal causing variations in a bale wrapping pattern in direct proportion to said variable signal value.

7. The control system of claim 1, wherein said wrapping apparatus further comprises a first wrapping apparatus, a second wrapping apparatus, or both, said operator interface further comprises a wrapping apparatus selector switch having a first apparatus position and a second apparatus position, and said controller is configured to initiate control output signals to interface with said first or said second wrapping apparatus dependent upon the position of said wrapping apparatus selector switch and regardless of whether said first or said second wrapping apparatus is present.

8. The control system of claim 7, wherein said first wrapping apparatus is a twine wrapping apparatus and said second wrapping apparatus is a net wrapping apparatus.

9. The control system of claim 1, further comprising a baler operation sensor and at least one visual indicator having first and second indication states and disposed on said operator interface, said baler operation sensor configured to monitor a non-bale wrapping function in the baler and provide a baler operation signal to said controller, said controller being configured upon receipt of said baler operation signal to initiate a visual output signal to said at least one visual indicator, said visual output signal causing said visual indicator to change between said first and second states with a variable frequency corresponding to variations in said baler operation signal.

10. The control system of claim 9, wherein said at least one baler operation sensor is a bale shape sensor, said baler operation signal is a variable bale shape signal representative of the shape of the bale forming in the baler, and said frequency is varied to correspond to variations in said bale input shape signal.

11. The control system of claim 10, wherein said visual output signal is varied to produce a plurality of unique visual alert sequences, each being unique in the number of alert pulses, duration of alert pulses, or frequency of alert pulses, said plurality of visual alert sequences individually corresponding to non-bale wrapping functions within the baler as well as non-bale wrapping faults within the baler.

12. In an agricultural round baler having a ground-supported main frame propelled by a tractor, an expandable bale forming chamber defined by a pair of opposing and spaced-apart side walls, a plurality of rolls, and belts, a wrapping apparatus for wrapping a completed bale, and a control system for managing operation of the baler, the improvement in the control system comprising:
a controller selectively configurable to manage operation of the wrapping apparatus by receiving one or more input signals and initiating one or more output signals responsive to said one or more input signals; and
an operator interface configured to be removeably positioned on the tractor during baler operation, said operator interface having at least one switch and a non-visual signaling device operably connected to said controller, said at least one switch having at least first and second positions, wherein said controller is configured to receive inputs from said at least one switch by cycling said at least one switch between said first and second positions a pre-determined number of cycles within a pre-determined time period, said controller further configured to initiate a signaling device output signal causing said non-visual signaling device to produce a plurality of unique alert sequences, each said alert sequence being unique through variations in number of alert pulses, duration of alert pulses, or frequency of alert pulses, said plurality of alert sequences individually corresponding to positions of the wrapping apparatus, stages of the wrapping operation, and faults within the wrapping apparatus thereby enabling said operator interface to inform an operator of wrapping apparatus operation without the use of a visual display.

13. The improvement of claim 12, wherein said non-visual signal device is an audible horn.

14. The improvement of claim 13, wherein said operator interface further comprises a wrap pattern selector switch having a first pattern position, a second pattern position, and a third pattern position, and said controller is configured to wrap the bale in one of three pre-determined wrap patterns based upon the position of the wrap pattern selector in said first, second, and third switch pattern positions, respectively, said controller further configured to initiate a bale wrapping cycle when said wrap pattern selector switch is cycled between said first and said second pattern positions a pre-determined number of times within a pre-determined time interval and to inform the operator of completion of said wrapping cycle by directing a wrap completion signal to said audible horn.

15. The improvement of claim 14, wherein said wrapping apparatus has at least one position sensor for monitoring the position of a wrapper mechanism and directing a position input signal to said controller, said wrapper mechanism positionable between generally opposing inserted and home positions, and said operator interface further comprises a wrapper mechanism position switch having an insert position, a retract position, and a neutral position, and said controller is configured to calibrate said at least one position sensor responsive to movement of said wrapper mechanism position switch to said insert position, detecting said wrapper mechanism reaching said inserted position and setting an extended position value in said controller corresponding to said at least one position sensor position input signal, directing a first calibration signal to said audible horn, detecting movement of said wrapper mechanism position switch to said home position, detecting said wrapper mechanism reaching said home position and setting an home position value in said controller corresponding to said at least one position sensor position input signal, and directing a second calibration signal to said audible horn.

16. The improvement of claim 15, wherein said wrap pattern selector switch is a mechanically actuated switch producing an output signal of variable value, said variable value determined by variations in switch position, said controller is response to said variable value signal causing variations in a bale wrapping pattern in direct proportion to said variable signal value.

17. The improvement of claim 15, wherein said operator interface further comprises a mode selector switch positionable in an automatic mode position, a manual mode position, or an off mode position, said controller further comprises an automatic operation mode, a manual operation mode, and an off mode, each selectable by positioning said mode selector switch in a corresponding position.

18. The improvement of claim 14, wherein said wrap pattern selector switch is a mechanically actuated switch producing an output signal having a variable value, said variable value determined by variations in switch position, said controller is response to said variable value signal causing variations in a bale wrapping pattern in direct proportion to said variable signal value.

19. The improvement of claim 12, wherein said wrapping apparatus further comprises a first wrapping apparatus, a second wrapping apparatus, or both, said operator interface further comprises a wrapping apparatus selector switch having a first apparatus position and a second apparatus position, and said controller is configured to initiate control output signals to interface with said first or said second wrapping apparatus dependent upon the position of said wrapping apparatus selector switch and regardless of whether said first or said second wrapping apparatus is present.

20. The improvement of claim 19, wherein said first wrapping apparatus is a twine wrapping apparatus and said second wrapping apparatus is a net wrapping apparatus.

21. The improvement of claim 12, further comprising a baler operation sensor and at least one visual indicator having first and second indication states and disposed on said operator interface, said baler operation sensor configured to monitor a non-bale wrapping function in the baler and provide a baler operation signal to said controller, said controller being configured upon receipt of said baler operation signal to initiate a visual output signal to said at least one visual indicator, said visual output signal causing said visual indicator to change between said first and second states with a variable frequency corresponding to variations in said baler operation signal.

22. The improvement of claim 21, wherein said visual output signal is varied to produce a plurality of unique visual alert sequences, each being unique in the number of alert pulses, duration of alert pulses, or frequency of alert pulses, said plurality of visual alert sequences individually corresponding to non-bale wrapping functions within the baler as well as non-bale wrapping faults within the baler.

23. The improvement of claim 22, wherein said at least one baler operation sensor is a bale shape sensor, said baler operation signal is a variable bale shape signal representative of the shape of the bale forming in the baler, and said frequency is varied to correspond to variations in said bale input shape signal.

* * * * *